(12) United States Patent
Horita

(10) Patent No.: US 6,765,620 B2
(45) Date of Patent: Jul. 20, 2004

(54) SYNCHRONOUS SIGNAL GENERATION CIRCUIT AND SYNCHRONOUS SIGNAL GENERATION METHOD

(75) Inventor: Masashi Horita, Kanagawa (JP)

(73) Assignee: NEC Electronics Corporation (JP)

( * ) Notice: Subject to any disclaimer, the term of this patent is extended or adjusted under 35 U.S.C. 154(b) by 424 days.

(21) Appl. No.: 09/965,203

(22) Filed: Sep. 27, 2001

(65) Prior Publication Data

US 2002/0036708 A1 Mar. 28, 2002

(30) Foreign Application Priority Data

Sep. 28, 2000 (JP) ........................................ 2000-295901

(51) Int. Cl.[7] ............................ H04N 9/455; H04N 5/06
(52) U.S. Cl. ...................................... 348/524; 348/521
(58) Field of Search ................................ 348/521, 524, 348/529, 530, 531, 540, 536, 537, 547; 345/213; 375/293; H04N 5/06, 9/45, 9/455

(56) References Cited

U.S. PATENT DOCUMENTS

| 5,148,276 A | * | 9/1992 | Furumiya et al. ............ 348/521 |
| 5,874,949 A | * | 2/1999 | Furukawa .................... 348/524 |
| 5,966,184 A | * | 10/1999 | Boehlke ...................... 348/524 |
| 6,137,536 A | * | 10/2000 | Yamaguchi .................. 348/521 |

FOREIGN PATENT DOCUMENTS

JP          7-87461         3/1995       ............ H04N/7/01

* cited by examiner

*Primary Examiner*—Sherrie Hsia
(74) *Attorney, Agent, or Firm*—Hayes Soloway P.C.

(57) ABSTRACT

A first counter counts a first clock signal repeatedly in accordance with an external synchronous signal. A second counter counts a second clock signal repeatedly in every predetermined cycle, and generates an internal synchronous signal having the predetermined cycle. A controller adjusts the cycle of counting performed by the second counter by controlling the second counter. By doing so, the controller controls the internal synchronous signal to synchronize with the external synchronous signal in each horizontal period.

16 Claims, 11 Drawing Sheets

SYNCHRONOUS SIGNAL GENERATION CIRCUIT AND SYNCHRONOUS SIGNAL GENERATION METHOD

BACKGROUND OF THE INVENTION

1. Field of the Invention

The present invention relates to a circuit and a method for generating a synchronous signal.

2. Description of the Related Art

An image processing apparatus such as a television set, a computer, or the like comprises a synchronous signal generation circuit for generating an internal horizontal synchronous signal and an internal vertical synchronous signal.

The image processing apparatus processes an image signal with using the internal horizontal synchronous signal and the internal vertical synchronous signal generated by the synchronous signal generation circuit, and displays an image on a display unit such as a CRT (Cathode Ray Tube) or the like.

The synchronous signal generation circuit generates the internal horizontal synchronous signal and the internal vertical synchronous signal by using an external horizontal synchronous signal and an external vertical synchronous signal from the outside.

The technique disclosed in Unexamined Japanese Patent Application KOKAI Publication No. H7-87461 forcibly controls an internal synchronous signal to synchronize with an external synchronous signal in each field, in a case where a difference between the phases of the external synchronous signal and internal synchronous signal exceeds a tolerable level.

In a case where external synchronous signals (an external vertical synchronous signal and an external horizontal synchronous signal) and internal synchronous signals (an internal vertical synchronous signal and an internal horizontal synchronous signal) are controlled to synchronize with each other in each field just as controlled to synchronize by the technique in the above-indicated publication, a difference between phases in each horizontal scanning period is carried over to the following horizontal scanning periods, so that differences between phases are accumulated in a period of one field, as shown in FIG. 10. Such the technique might not be able to display a high-quality image.

The content of Unexamined Japanese Patent Application KOKAI Publication No. H7-87461 is incorporated herein by reference.

SUMMARY OF THE INVENTION

Accordingly, it is an object of the present invention to provide a synchronous signal generation circuit and a synchronous signal generation method for displaying a high-quality image.

To accomplish the above object, a synchronous signal generation circuit according to a first aspect of the present invention comprises:

a first counter which counts pulses of a first clock signal in every first cycle of a supplied first horizontal synchronous signal repeatedly;

a second counter which repeatedly counts pulses of a second clock signal in every predetermined second cycle, and generates a second horizontal synchronous signal having the second cycle; and a first controller which controls the second horizontal synchronous signal to synchronize with the first horizontal synchronous signal by controlling the second counter in accordance with a difference between a first value counted by the first counter, and a second value counted by the second counter.

According to this invention, a high-quality image can be displayed.

The first counter may generate a first pulse signal having the first cycle, as well as counting pulses of the first clock signal.

The second counter may generate a second pulse signal having the second cycle, as well as generating the second horizontal synchronous signal.

The synchronous signal generation circuit may further comprise:

a third counter which repeatedly counts pulses of the first pulse signal in every third cycle of a supplied first vertical synchronous signal;

a fourth counter which repeatedly counts pulses of the second pulse signal in every predetermined fourth cycle, and generates a second vertical synchronous signal having the fourth cycle; and a second controller which controls the second vertical synchronous signal to synchronize with the first vertical synchronous signal by controlling the fourth counter in accordance with a difference between a third value counted by the third counter and a fourth value counted by the fourth counter.

The first controller may control a phase of the second horizontal synchronous signal to substantially be equal to a phase of the first horizontal synchronous signal by controlling the second counter so that an absolute value of the difference between the first value and the second value is equal to or smaller than a first preset value.

The first controller may stop an operation of the second counter for a predetermined period in a case where a value obtained by subtracting the first value from the second value is greater than the first preset value, and may control the operation of the second counter to jump in a case where the value obtained by subtracting the first value from the second value is smaller than a minus value of the first preset value.

The second controller may control a phase of the second vertical synchronous signal to substantially be equal to a phase of the first vertical synchronous signal by controlling the fourth counter so that an absolute value of the difference between the third value and the fourth value is equal to or smaller than a second preset value.

The second controller may stop an operation of the fourth counter for a predetermined period in a case where a value obtained by subtracting the third value from the fourth value is greater than the second preset value, and may control the operation of the fourth counter to jump in a case where the value obtained by subtracting the third value from the fourth value is smaller than a minus value of the second preset value.

The synchronous signal generation circuit may further comprise a signal supplier which supplies the second pulse signal generated by the second counter to the fourth counter.

The second controller may control the fourth counter by controlling an operation of the signal supplier.

The second controller may control the signal supplier so that an absolute value of the difference between the third value and the fourth value is equal to or smaller than a second preset value.

By controlling the signal supplier, the second controller may stop a supply of the second pulse signal for a predetermined period in a case where a value obtained by subtracting the third value from the fourth value is greater than the second preset value, and may successively supply a predetermined number of pulses of the second pulse signal to the fourth counter in a case where the value obtained by subtracting the third value from the fourth value is smaller than a minus value of the second preset value.

The synchronous signal generation circuit may further comprise a delay circuit which delays the first value counted by the first counter, and the third value counted by the third counter.

The first controller may control the second counter in accordance with a difference between the delayed first value and the second value.

The second controller may control the fourth counter in accordance with a difference between the delayed third value and the fourth value.

A synchronous signal generation circuit according to a second aspect of the present invention comprises:

a first counter which repeatedly counts pulses of a first clock signal in every first cycle of a supplied first horizontal synchronous signal, and generates a first pulse signal having the first cycle;

a second counter which repeatedly counts pulses of a second clock signal in every predetermined second cycle, generates a second horizontal synchronous signal having the second cycle, and generates a second pulse signal having the second cycle;

a third counter which repeatedly counts pulses of the first pulse signal in every third cycle of a supplied first vertical synchronous signal;

a fourth counter which repeatedly counts pulses of the second pulse signal in every predetermined fourth cycle, and generates a second vertical synchronous signal having the fourth cycle;

a control signal supplier which generates a control signal for controlling an operation of the second counter or the fourth counter in accordance with a difference between a first value counted by the first counter and a second value counted by the second counter, or in accordance with a difference between a third value counted by the third counter and a fourth value counted by the fourth counter, and supplies the control signal to the second counter or to the fourth counter;

a first selector which selects one of the first value and the third value, and one of the second value and the fourth value, and supplies the selected values to the control signal supplier; and a second selector which selects one of the second counter and the fourth counter as a target to be supplied with the control signal, wherein:
the second counter generates the second horizontal synchronous signal synchronizing with the first horizontal synchronous signal in accordance with the control signal; and
the fourth counter generates the second vertical synchronous signal synchronizing with the first vertical synchronous signal in accordance with the control signal.

A synchronous signal generation method according to a third aspect of the present invention comprises:
counting pulses of a first clock signal repeatedly in every first cycle of a supplied first horizontal synchronous signal;
counting pulses of a second clock signal in every predetermined second cycle repeatedly;
generating a second horizontal synchronous signal having the second cycle; and
controlling the second horizontal synchronous signal to synchronize with the first horizontal synchronous signal, by adjusting the second cycle in accordance with a difference between a first value obtained by counting pulses of the first clock signal and a second value obtained by counting pulses of the second clock signal.

The synchronous signal generation method may further comprise:
generating a first pulse signal having the first cycle;
generating a second pulse signal having the second cycle;
counting pulses of the first pulse signal repeatedly in every third cycle of a supplied first vertical synchronous signal;
counting pulses of the second pulse signal repeatedly in every predetermined fourth cycle;
generating a second vertical synchronous signal having the fourth cycle; and
controlling the second vertical synchronous signal to synchronize with the first vertical synchronous signal, by adjusting the fourth cycle in accordance with a difference between a third value obtained by counting pulses of the first pulse signal and a fourth value obtained by counting pulses of the second pulse signal.

The synchronous signal generation method may further comprise:
delaying the first value; and
delaying the third value.

The controlling the second horizontal synchronous signal to synchronize may comprise adjusting the second cycle in accordance with a difference between the delayed first value and the second value.

The controlling the second vertical synchronous signal to synchronize may comprise adjusting the fourth cycle in accordance with a difference between the delayed third value and the fourth value.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

A synchronous signal generation circuit according to a first embodiment of the present invention will now be explained below with reference to the drawings.

The synchronous signal generation circuit according to the first embodiment of the present invention is to be provided in an image processing apparatus such as a television set, a computer, or the like.

Figure 1:
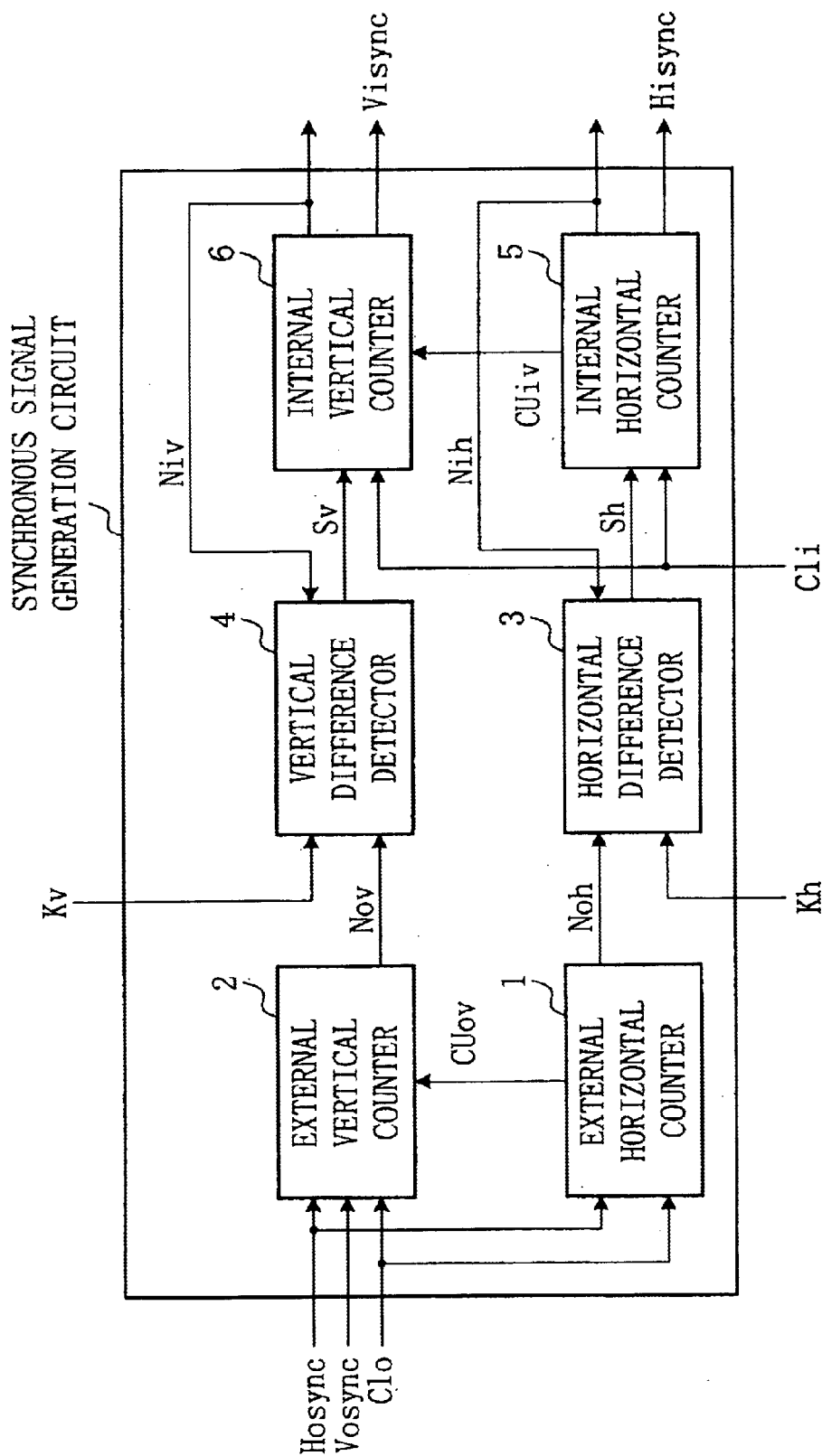
FIG. 1 is a block diagram of a synchronous signal generation circuit according to a first embodiment.

FIG. 1 is a block diagram of the synchronous signal generation circuit according to the first embodiment.

The synchronous signal generation circuit is supplied with an external horizontal synchronous signal Hosync, an external vertical synchronous signal Vosync, and an external clock signal Clo from the outside of the image processing apparatus. The synchronous signal generation circuit is also supplied with a horizontal check value Kh, a vertical check value Kv, and an internal clock signal Cli from another circuit (not shown) of the image processing apparatus.

The synchronous signal generation circuit generates an internal horizontal synchronous signal Hisync and an internal vertical synchronous signal Visync with using the supplied signals, and outputs the generated signals to a predetermined circuit of the image processing apparatus.

As shown in FIG. 1, the synchronous signal generation circuit comprises an external horizontal counter 1, an external vertical counter 2, a horizontal difference detector 3, a vertical difference detector 4, an internal horizontal counter 5, and an internal vertical counter 6.

The external horizontal counter 1 counts the external clock signal Clo supplied from the outside. Specifically, the external horizontal counter 1 counts up pulses of the external clock signal Clo. Then, the external horizontal counter 1 outputs a value (an external horizontal count value Noh) obtained by counting the pulses to the horizontal difference detector 3. At this time, the external horizontal counter 1 repeats counting the external clock signal Clo in every cycle of the external horizontal synchronous signal Hosync. Specifically, the external horizontal counter 1 initializes the external horizontal count value Noh in accordance with a pulse of the external horizontal synchronous signal Hosync, and repeats counting the external clock signal Clo. A period between one pulse of the external horizontal synchronous signal Hosync and the next pulse thereof equals a period in which one horizontal line of an image (or a screen) is scanned.

The external horizontal counter 1 outputs an external vertical count up signal CUov whose cycle is the same as the cycle of the count-repeating to the external vertical counter 2. Specifically, the external horizontal counter 1 outputs a pulse of the external vertical count up signal CUov to the external vertical counter 2, for example, at the timing of initializing the external horizontal count value Noh.

The external vertical counter 2 counts the external vertical count up signal CUov supplied from the external horizontal counter 1. Specifically, the external vertical counter 2 counts up pulses of the external vertical count up signal CUov. Then, the external vertical counter 2 outputs a value (an external vertical count value Nov) obtained by counting the pulses to the vertical difference detector 4. At this time, the external vertical counter 2 repeats counting the external vertical count up signal CUov in every cycle of the external vertical synchronous signal Vosync. Specifically, the external vertical counter 2 initializes the external vertical count value Nov in accordance with a pulse of the external vertical synchronous signal Vosync, and repeats counting the external vertical count up signal CUov. A period between one pulse of the external vertical synchronous signal Vosync and the next pulse thereof equals a period in which one field of an image is scanned.

The horizontal difference detector 3 is supplied with the external horizontal count value Noh from the external horizontal counter 1, an internal horizontal count value Nih from the internal horizontal counter 5, and the horizontal check value Kh from a predetermined circuit of the image processing apparatus. The horizontal difference detector 3 outputs a horizontal counter control signal Sh for controlling the internal horizontal counter 5 to the internal horizontal counter 5 with using the supplied signals. The operation of the horizontal difference detector 3 will be explained in detail later.

The vertical difference detector 4 is supplied with the external vertical count value Nov from the external vertical counter 2, an internal vertical count value Niv from the internal vertical counter 6, and the vertical check value Kv from a predetermined circuit of the image processing apparatus. The vertical difference detector 4 outputs a vertical counter control signal Sv for controlling the internal vertical counter 6 to the internal vertical counter 6 with using the supplied signals. The operation of the vertical difference detector 4 will be explained in detail later.

The internal horizontal counter 5 counts the internal clock signal Cli supplied from a predetermined circuit of the image processing apparatus in accordance with the horizontal counter control signal Sh supplied from the horizontal difference detector 3. Specifically, the internal horizontal counter 5 counts up pulses of the internal clock signal Cli. Then, the internal horizontal counter 5 outputs the value (the internal horizontal count value Nih) obtained by counting the pulses to the horizontal difference detector 3. At this time, the internal horizontal counter 5 repeats counting the internal clock signal Cli in every predetermined cycle. Specifically, the internal horizontal counter 5 initializes the internal horizontal count value Nih when the internal horizontal count value Nih reaches a predetermined value, and repeats counting the internal clock signal Cli. The predetermined value which specifies the timing to initialize the internal horizontal count value Nih is previously set so that the cycle of counting the internal clock signal Cli corresponds to a cycle in which a horizontal line of an image (or a screen) is scanned.

The internal horizontal counter 5 outputs an internal vertical count up signal CUiv whose cycle is the same as the count-repeating cycle to the internal vertical counter 6. Specifically, the internal horizontal counter 5 outputs a pulse of the internal vertical count up signal CUiv to the internal vertical counter 6, for example, at the timing of initializing the internal horizontal count value Nih.

The internal horizontal counter 5 generates the horizontal synchronous signal (internal horizontal synchronous signal Hisync) for controlling a circuit inside the image processing apparatus to operate. Specifically, the internal horizontal counter 5 generates the internal horizontal synchronous signal Hisync whose cycle is the same as the count-repeating cycle. Then, the internal horizontal counter 5 outputs the generated internal horizontal synchronous signal Hisync to the predetermined internal circuit.

The internal vertical counter 6 counts the internal vertical count up signal CUiv supplied from the internal horizontal counter 5 in accordance with the vertical counter control signal Sv supplied from the vertical difference detector 4. Specifically, the internal vertical counter 6 counts up pulses of the internal vertical count up signal CUiv. Then, the internal vertical counter 6 outputs the value (the internal vertical count value Niv) obtained by counting the pulses to the vertical difference detector 4. At this time, the internal vertical counter 6 repeats counting the internal vertical count up signal CUiv in every predetermined cycle. Specifically, the internal vertical counter 6 initializes the internal vertical count value Niv when the internal vertical count value Niv reaches a predetermined value, and repeats counting the internal vertical count up signal CUiv. The predetermined value which specifies the timing to initialize the internal vertical count value Niv is previously set so that the cycle of counting the internal vertical count up signal CUiv corresponds to a cycle of scanning a filed of an image.

The internal vertical counter 6 generates the vertical synchronous signal (internal vertical synchronous signal Visync) for controlling a circuit inside the image processing apparatus to operate. Specifically, the internal vertical counter 6 generates the internal vertical synchronous signal Visync whose cycle is the same as the count-repeating cycle. Then, the internal vertical counter 6 outputs the generated internal vertical synchronous signal Visync to the predetermined internal circuit.

The operation of the synchronous signal generation circuit according to the first embodiment will now be explained.

The operations of the external horizontal counter 1, the horizontal difference detector 3, and the internal horizontal counter 5 are similar to the operations of the external vertical counter 2, the vertical difference detector 4, and the internal vertical counter 6. Therefore, the operations of the external horizontal counter 1, the horizontal difference detector 3, and the internal horizontal counter 5 are explained first.

The external horizontal counter 1 initializes the external horizontal count value Noh in accordance with a pulse of the external horizontal synchronous signal Hosync. For example, the external horizontal counter 1 sets the external horizontal count value Noh to zero in accordance with the pulse of the external horizontal synchronous signal Hosync.

Then, the external horizontal counter 1 counts up the external clock signal Clo from the value obtained by initialization, and outputs the external horizontal count value Noh to the horizontal difference detector 3.

After this, the external horizontal counter 1 initializes the external horizontal count value Noh in accordance with the next pulse of the external horizontal synchronous signal Hosync, and repeats counting the external clock signal Clo.

On the other hand, the internal horizontal counter 5 counts the internal clock signal Cli in accordance with the horizontal counter control signal Sh from the horizontal difference detector 3, and outputs the internal horizontal count value Nih to the horizontal difference detector 3.

At this time, the internal horizontal counter 5 initializes the internal horizontal count value Nih in every predetermined cycle. For example, the internal horizontal counter 5 sets the internal horizontal count value Nih to zero in every predetermined period. Due to this, the internal horizontal counter 5 repeats counting the internal clock signal Cli in every predetermined cycle.

The horizontal difference detector 3 generates the horizontal counter control signal Sh for controlling the internal horizontal counter 5 with using the external horizontal count value Noh, the internal horizontal count value Nih, and the horizontal check value Kh.

Then, the horizontal difference detector 3 controls the operation of the internal horizontal counter 5 by the generated horizontal counter control signal Sh.

Figure 2:
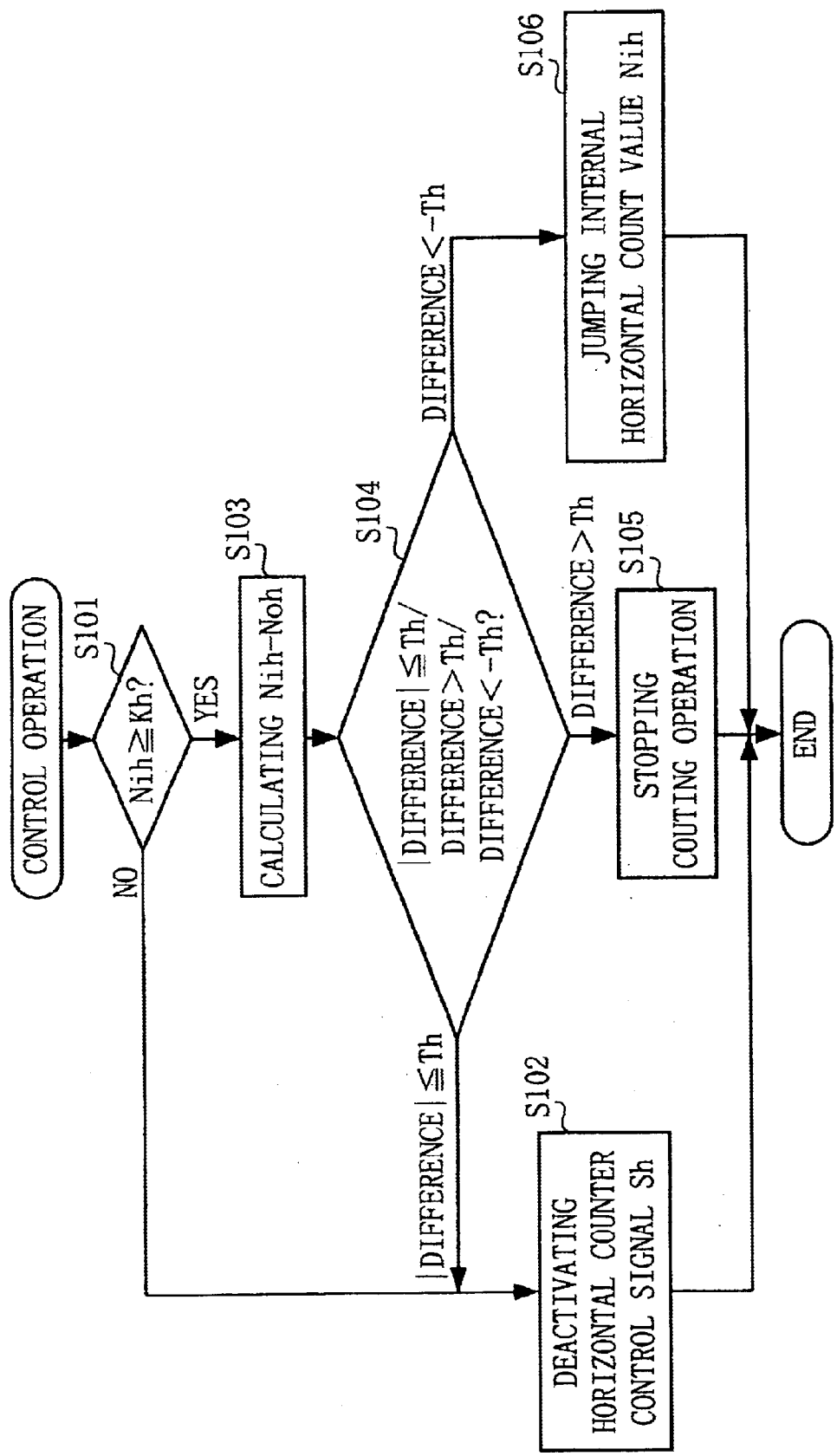
FIG. 2 is a flowchart showing a control operation performed by a horizontal difference detector included in the synchronous signal generation circuit shown in FIG. 1.

FIG. 2 is a flowchart showing the control operation performed by the horizontal difference detector 3.

As a beginning, the horizontal difference detector 3 determines whether or not the internal horizontal count value Nih is equal to or greater than the horizontal check value Kh (step S101). The horizontal check value Kh is a value for deciding the timing to start comparing the internal horizontal count value Nih with the external horizontal count value Noh.

In a case where the internal horizontal count value Nih is determined not to be equal to or greater than the horizontal check value Kh, that is, determined to be smaller than the horizontal check value Kh (step S101; NO), the horizontal difference detector 3 deactivates the horizontal counter control signal Sh to be output to the internal horizontal counter 5 (step S102). In this case, the internal horizontal counter 5 ordinarily counts the internal clock signal Cli.

On the other hand, in a case where the internal horizontal count value Nih is determined to be equal to or greater than the horizontal check value Kh, (step S101; YES), the horizontal difference detector 3 derives the difference between the internal horizontal count value Nih and the external horizontal count value Noh (the internal horizontal count value Nih—the external horizontal count value Noh) (step S103).

Then, the horizontal difference detector 3 determines whether the absolute value of the derived difference is equal to or smaller than a preset value Th, whether the derived difference is greater than the preset value Th, or whether the derived difference is smaller than a minus value of the preset value Th (step S104). The preset value Th is a reference value of whether a disorder of an image resulting from that the counting operations of the external horizontal counter 1 and the internal horizontal counter 5 do not coincide with each other is easily recognized by a person or not, and previously set based on the kind of an image processing apparatus.

In a case where the absolute value of the difference is determined to be equal to or smaller than the preset value Th (step S104; |difference|≦Th), the horizontal difference detector 3 performs the above-described step S102.

In a case where the difference is determined to be greater than the preset value Th (step S104; difference>Th), the horizontal difference detector 3 stops the operation of the internal horizontal counter 5 for a predetermined period by activating the horizontal counter control signal Sh (step S105). Due to this, the absolute value of the difference is controlled to be equal to or smaller than the preset value Th.

In a case where the difference is determined to be smaller than the minus value of the preset value Th (step S104;

difference <−Th), the horizontal difference detector 3 controls the operation of the internal horizontal counter 5 to jump by activating the horizontal counter control signal Sh (step S106). Specifically, the horizontal difference detector 3 controls the internal horizontal counter 5 to increase the internal horizontal count value Nih by a number corresponding to the amount of the difference. Due to this, the absolute value of the difference is controlled to be equal to or smaller than the preset value Th.

By the above-described control operation, the difference between the internal horizontal count value Nih and the external horizontal count value Noh is corrected. In other words, the counting operation of the internal horizontal counter 5 is controlled to coincide with the counting operation of the external horizontal counter 1. Due to this, the internal horizontal counter 5 can generate the internal horizontal synchronous signal Hisync whose phase substantially equals the phase of the external horizontal synchronous signal Hosync.

Figure 3A:
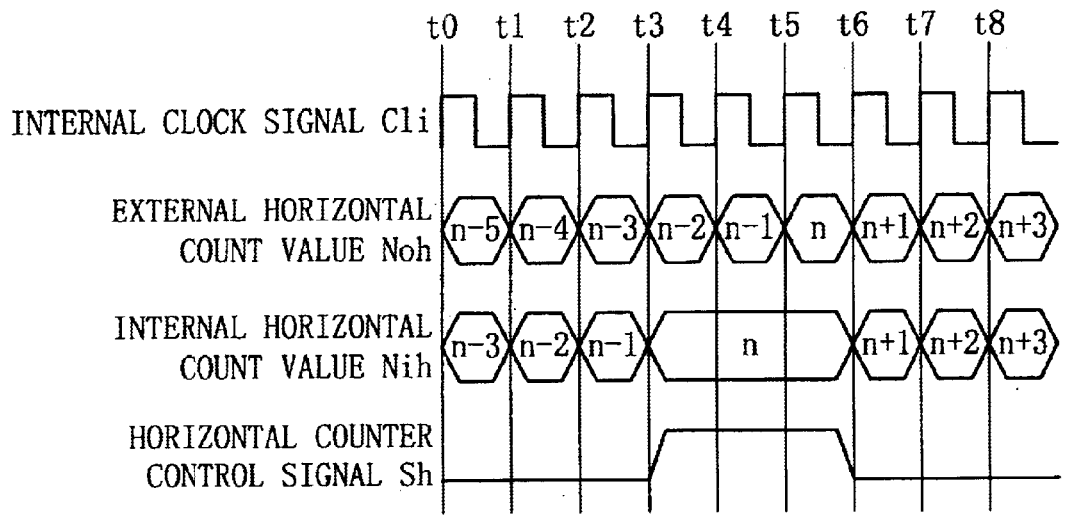
FIGS. 3A to 3C are timing charts showing the relation among an internal clock signal, an external horizontal count value, an internal horizontal count value, and a horizontal counter control signal.
Figure 3B:
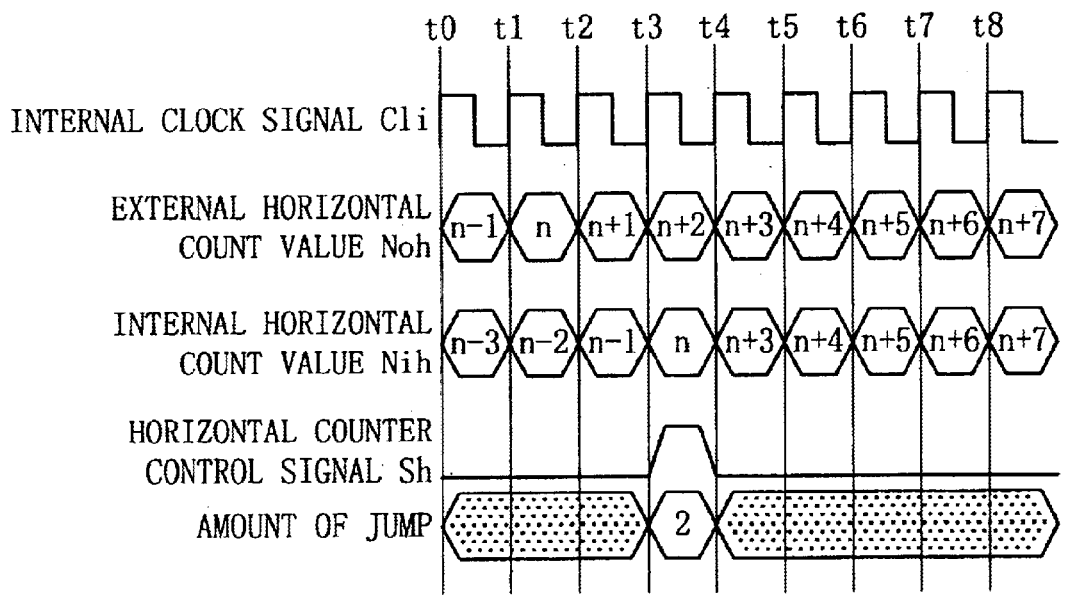
Figure 3C:
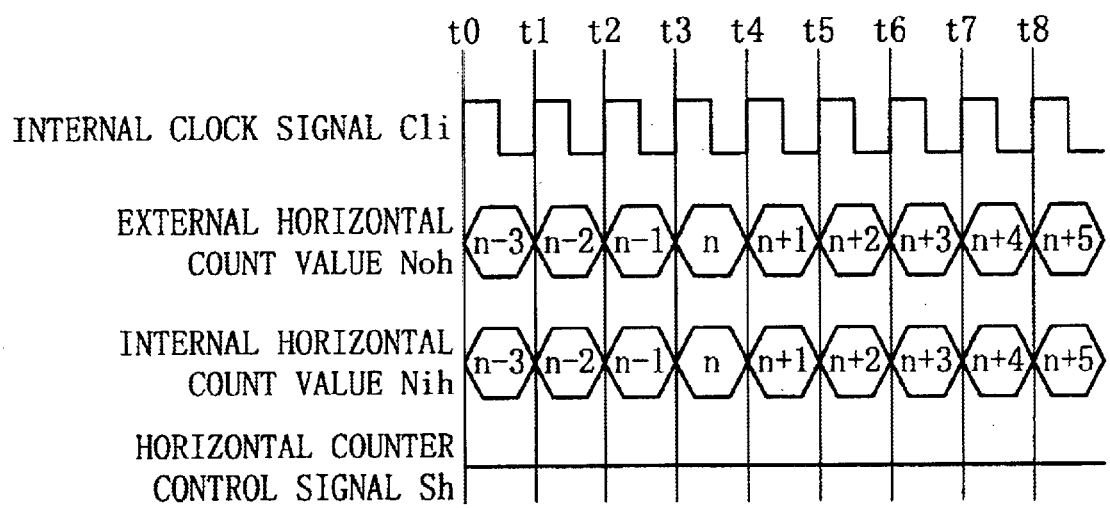

FIGS. 3A to 3C are timing charts for more specifically explaining the above-described operations of the horizontal difference detector 3 and the internal horizontal counter 5. In FIGS. 3A to 3C, the horizontal check value Kh is "n".

FIG. 3A is a timing chart of a case where the internal horizontal count value Nih is ahead of the external horizontal count value Noh by 2.

In this case, when the time is t3, that is, when the internal horizontal count value Nih becomes "n", the horizontal difference detector 3 determines that the internal horizontal count value Nih is equal to or greater than the horizontal check value Kh(=n)(step S101 in FIG. 2; YES).

Then, the horizontal difference detector 3 derives the difference between the internal horizontal count value Nih and the external horizontal count value Noh (Nih−Noh) (step S103 in FIG. 2). In this case, the difference is "2".

Then, the horizontal difference detector 3 determines whether the absolute value of the derived difference is equal to or smaller than the preset value Th, whether the derived difference is greater than the preset value Th, or whether the derived difference is smaller than the minus value of the preset value Th (step S104 in FIG. 2). In this example, the preset value Th is set to 0 (zero).

In this case, the horizontal difference detector 3 determines that the difference (=2) is greater than the preset value Th (=0) (step S104 in FIG. 2; difference>Th). Then, the horizontal difference detector 3 stops the counting operation of the internal horizontal counter 5 for a predetermined period by activating the horizontal counter control signal Sh (step S105 in FIG. 2).

Specifically, as shown in FIG. 3A, the horizontal difference detector 3 stops the operation of the internal horizontal counter 5 for a period corresponding to the difference, that is, from the time t3 to the time t5. Due to this, at the time t5, both of the internal horizontal count value Nih and the external horizontal count value Noh become "n", so that the counting operation of the internal horizontal counter 5 coincides with the counting operation of the external horizontal counter 1.

The FIG. 3B is a timing chart of a case where the internal horizontal count value Nih is behind the external horizontal count value Noh by 2.

Also in this case, when the time is t3, that is, when the internal horizontal count value Nih becomes "n", the horizontal difference detector 3 determines that the internal horizontal count value Nih is equal to or greater than the horizontal check value Kh (=n) (step S101 in FIG. 2; YES).

Then, the horizontal difference detector 3 derives the difference between the internal horizontal count value Nih and the external horizontal count value Noh (Nih−Noh) (step S103 in FIG. 2). In this case, the difference is "−2".

The horizontal difference detector 3 determines whether the absolute value of the derived difference is equal to or smaller than the preset value Th (=0), whether the derived difference is greater than the preset value Th, or whether the derived difference is smaller than the minus value of the preset value Th (S104 in FIG. 2).

In this case, the horizontal difference detector 3 determines that the difference (=−2) is smaller than the minus value of the preset value Th (=0) (step S104 in FIG. 2; difference <−Th). Then, the horizontal difference detector 3 controls the operation of the internal horizontal counter 5 to jump by activating the horizontal counter control signal Sh (step S106 in FIG. 2).

Specifically, as shown in FIG. 3B, the horizontal difference detector 3 controls the internal horizontal counter 5 to increase the internal horizontal count value Nih by a number corresponding to the amount of the difference, that is, "2". Due to this, at the time t4, both of the internal horizontal count value Nih and the external horizontal count value Noh become "n+3", so that the counting operation of the internal horizontal counter coincides with the counting operation of the external horizontal counter 1.

FIG. 3C is a timing chart of a case where the internal horizontal count value Nih and the external horizontal count value Noh are the same.

Also in this case, when the time is t3, that is, when the internal horizontal count value Nih becomes "n", the horizontal difference detector 3 determines that the internal horizontal count value Nih is equal to or greater than the horizontal check value Kh (=n) (step S101 in FIG. 2; YES).

Then, the horizontal difference detector 3 derives the difference between the internal horizontal count value Nih and the external horizontal count value Noh (Nih−Noh) (step S103 in FIG. 2). In this case, the difference is "0".

Then, the horizontal difference detector 3 determines whether the absolute value of the derived difference is equal to or smaller than the preset value Th (=0), whether the derived value is greater than the preset value Th, or whether the derived difference is smaller than the minus value of the preset value Th (step S104 in FIG. 2).

In this case, the horizontal difference detector 3 determines that the difference (=0) is equal to or smaller than the preset value Th (=0) (step S104 in FIG. 2; |difference|≦Th). Then, the horizontal difference detector 3 deactivates the horizontal counter control signal Sh to be output to the internal horizontal counter 5, as shown in FIG. 3C (step S102 in FIG. 2). In this case, as shown in FIG. 3C, the internal horizontal counter 5 ordinarily counts the internal clock signal Cli.

The horizontal difference detector 3 performs the above control operation in order to control the counting operation of the internal horizontal counter 5, every time the horizontal difference detector 3 is supplied with the internal horizontal count value Nih. Due to this, the counting operation of the internal horizontal counter 5 synchronizes with the counting operation of the external horizontal counter 1. In other words, the internal horizontal counter 5 repeats counting the internal clock signal Cli, while synchronizing with the external horizontal synchronous signal Hosync. Due to this, the internal horizontal counter 5 can generate the internal horizontal synchronous signal Hisync which synchronizes with the external horizontal synchronous signal Hosync and whose phase substantially equals the phase of the external horizontal synchronous signal Hosync.

In addition to the above operation, the external horizontal counter 1 outputs the external vertical count up signal CUov to the external vertical counter 2, for example, each time it initializes the external horizontal count value Noh.

In addition to the above operation, the internal horizontal counter 5 outputs the internal vertical count up signal CUiv to the internal vertical counter 6, for example, each time it initializes the internal horizontal count value Nih.

The external vertical counter 2 initializes the external vertical count value Nov in accordance with a pulse of the external vertical synchronous signal Vosync. For example, the external vertical counter 2 sets the external vertical count value Nov to zero in accordance with the pulse of the external vertical synchronous signal Vosync.

Then, the external vertical counter 2 counts up the external vertical count up signal CUov from the value obtained by initialization, and outputs the external horizontal count value Noh to the vertical difference detector 4.

After this, the external vertical counter 2 initializes the external vertical count value Nov in accordance with the next pulse of the external vertical synchronous signal Vosync, and repeats counting the external vertical count up signal CUov.

On the other hand, the internal vertical counter 6 counts the internal vertical count up signal CUov in accordance with the vertical counter control signal Sv from the vertical difference detector 4, and outputs the internal vertical count value Niv to the vertical difference detector 4.

At this time, the internal vertical counter 6 initializes the internal vertical count value Niv in every predetermined cycle. For example, the internal vertical counter 6 sets the internal vertical count value Niv to zero in every predetermined cycle. Due to this, the internal vertical counter 6 repeats counting the internal vertical count up signal CUiv in every predetermined cycle.

The vertical difference detector 4 generates the vertical counter control signal Sv for controlling the operation of the internal vertical counter 6 with using the external vertical count value Nov, the internal vertical count value Niv, and the vertical check value Kv.

Then, the vertical difference detector 4 controls the operation of the internal vertical counter 6 by the generated vertical counter control signal Sv.

The operation performed by the vertical difference detector 4 is the same as the above-described operation of the horizontal difference detector 3. Specifically, the operation of the vertical difference detector 4 is the same as the operation of the horizontal difference detector 3 except the external vertical count value Nov instead of the external horizontal count value Noh, the internal vertical count value Niv instead of the internal horizontal count value Nih, the vertical check value Kv instead of the horizontal check value Kh, and the vertical counter control signal Sv instead of the horizontal counter control signal Sh being used. The vertical check value Kv is a value for determining the timing to start comparing the internal vertical count value Niv with the external vertical count value Nov.

The vertical difference detector 4 derives the difference between the internal vertical count value Niv and the external vertical count value Nov (internal vertical count value Niv−external vertical count value Nov), when the internal vertical count value Niv is equal to or greater than the vertical check value Kv.

Then, the vertical difference detector 4 determines whether the absolute value of the derived difference is equal to or smaller than a preset value Tv, whether the derived difference is greater than the preset value Tv, or whether the derived difference is smaller than a minus value of the preset value Tv. The preset value Tv is a reference value of whether a disorder of an image resulting from that the counting operations of the external vertical counter 2 and the internal vertical counter 6 do not coincide with each other is easily recognized by a person or not, and previously set based on the kind of an image processing apparatus.

The vertical difference detector 4 activates or deactivates the vertical counter control signal Sv to be output to the internal vertical counter 6 in accordance with a determination result.

Specifically, in case of determining that the absolute value of the difference is equal to or smaller than the preset value Tv, the vertical difference detector 4 deactivates the vertical counter control signal Sv. In this case, the internal vertical counter 6 ordinarily counts the internal vertical count up signal CUiv.

In case of determining that the difference is greater than the preset value Tv, the vertical difference detector 4 stops the operation of the internal vertical counter 6 for a period corresponding to the difference by activating the vertical counter control signal Sv.

In case of determining that the difference is smaller than the minus value of the preset value Tv, the vertical difference detector 4 controls the operation of the internal vertical counter 6 to jump by activating the vertical counter control signal Sv. Specifically, the vertical difference detector 4 increases the internal vertical count value Niv counted by the internal vertical counter 6 by a number corresponding to the amount of the difference.

By the above-described operation, the counting operation of the internal vertical counter 6 synchronizes with the counting operation of the external vertical counter 2. In other words, the internal vertical counter 6 repeats counting the internal vertical count up signal CUiv while synchronizing with the external vertical synchronous signal Vosync. Due to this, the internal vertical counter 6 can generate the internal vertical synchronous signal Visync which synchronizes with the external vertical synchronous signal Vosync, and whose phase substantially equals the phase of the external vertical synchronous signal Vosync.

Figure 4A:
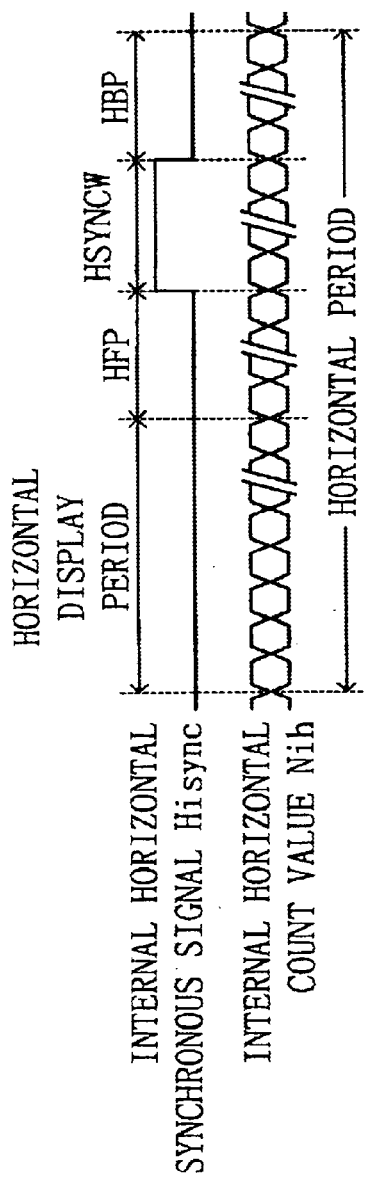
FIG. 4A is a diagram showing the composition of one horizontal period which is a period for scanning one horizontal line of an image, and the relation between the horizontal period and an internal horizontal synchronous signal.
Figure 4B:
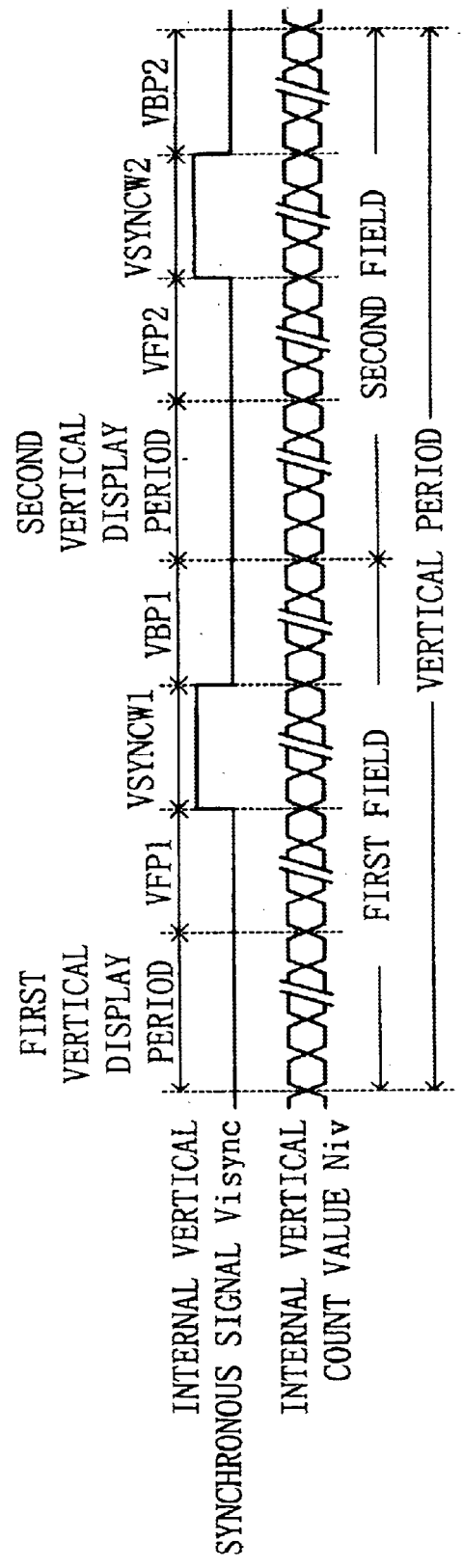
FIG. 4B is a diagram showing the composition of one vertical period which is a period for scanning one frame of an image, and the relation between the frame and an internal vertical synchronous signal.

FIG. 4A is a diagram showing the relation between the composition of one horizontal period which is a period for scanning one horizontal line of a screen, and the internal horizontal synchronous signal Hisync generated by the internal horizontal counter 5. FIG. 4B is a diagram showing the relation between the composition of one vertical period which is a period for scanning one frame of a screen, and the internal vertical synchronous signal Visync generated by the internal vertical counter 6.

As shown in FIG. 4A, one horizontal period comprises a horizontal display period, a horizontal front porch HFP, a horizontal synchronous signal width HSYNCW, and a horizontal back porch HBP.

The horizontal display period is a period for horizontally scanning a display area of the screen from the left end to the right end.

The horizontal front porch HFP corresponds to a period for scanning a non-display area locating at the right of the display area from the left end to the right end.

The horizontal synchronous signal width HSYNCW corresponds to a period for returning from the right end of the non-display area locating at the right of the display area to the left end of a non-display area locating at the left of the display area.

The horizontal back porch HBP corresponds to a period for scanning the non-display area locating at the left of the display area from the left end to the right end.

As shown in FIG. 4A, the internal horizontal counter 5 outputs a pulse of the internal horizontal synchronous signal Hisync at the same timing as a predetermined timing for outputting the internal horizontal count value Nih.

On the other hand, one vertical period comprises a first field (or an odd number field) and a second field (or an even number field), as shown in FIG. 4B.

The first field comprises a first vertical display period, a first vertical front porch VFP1, a vertical synchronous signal width VSYNCW1, and a first vertical back porch VBP1.

The first vertical display period is a period for scanning the display area in the first field.

The first vertical front porch VFP1 corresponds to a period for scanning a non-display area locating beneath the display area from the top end to the bottom end.

The vertical synchronous signal width VSYNCW1 corresponds to a period for returning from the bottom end of the non-display area beneath the display area to the top end of a non-display area locating above the display area.

The first vertical back porch VBP1 corresponds to a period for scanning the non-display area locating above the display area from the top end to the bottom end.

The second field comprises a second vertical display period, a second front porch VFP2, a vertical synchronous signal width VSYNCW2, and a second vertical back porch VBP2, as well as the first field.

The second vertical display period is a period for scanning the display area in the second field.

The second vertical front porch VFP2 corresponds to a period for scanning the non-display area locating beneath the display area from the top end to the bottom end.

The vertical synchronous signal width VSYNCW2 corresponds to a period for returning from the bottom end of the non-display area locating beneath the display area to the top end of the non-display area locating above the display area.

The second vertical back porch VBP2 corresponds to a period for scanning the non-display area locating above the display area from the top end to the bottom end.

As shown in FIG. 4B, the internal vertical counter 6 outputs a pulse of the internal vertical synchronous signal Visync at the same timing as a predetermined timing for outputting the internal vertical count value Niv.

Figure 5:
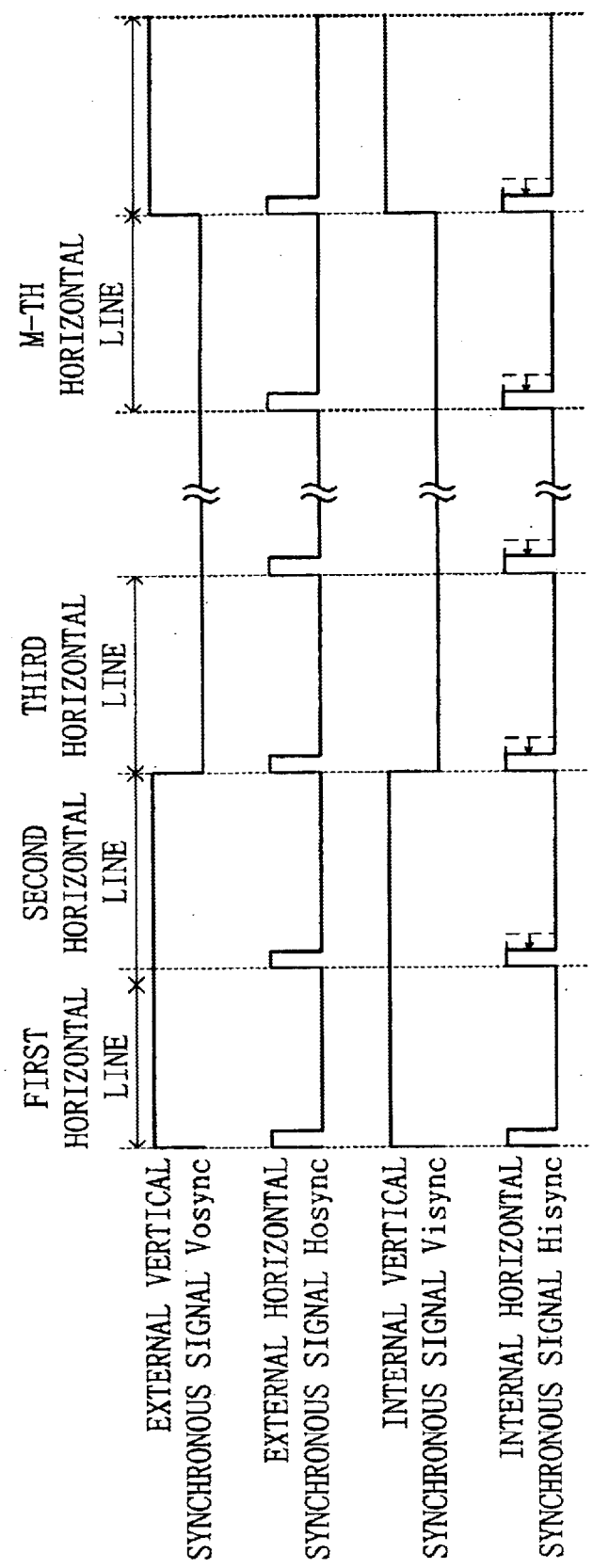
FIG. 5 is a diagram showing phases of an external vertical synchronous signal, an external horizontal synchronous signal, an internal vertical synchronous signal, and an internal horizontal synchronous signal.

FIG. 5 is a diagram showing the relation of the phases of the external vertical synchronous signal Vosync, the external horizontal synchronous signal Hosync, the internal horizontal synchronous signal Hisync, and the internal vertical synchronous signal Visync.

By the above-described operation, a difference between the phases of the internal horizontal synchronous signal Hisync and the external horizontal synchronous signal Hosync is corrected in each horizontal line. Because of this, as shown in FIG. 5, each difference between the phases of the horizontal synchronous signals does not remain in the following horizontal lines, so that there is no difference caused between the phases of the internal vertical synchronous signal Visync generated based on the internal horizontal synchronous signal Hisync and the external vertical synchronous signal Vosync.

As explained so far, with the use of the synchronous signal generation circuit according to the first embodiment, the difference between the phases of the external horizontal synchronous signal Hosync and the internal horizontal synchronous signal Hisync, and the difference between the phases of the external vertical synchronous signal Vosync and the internal vertical synchronous signal Visync can be made much smaller than ever before. Due to this, a high-quality image can be displayed.

Next, a synchronous signal generation circuit according to a second embodiment of the present invention will now be explained below with reference to the drawings.

Figure 6:
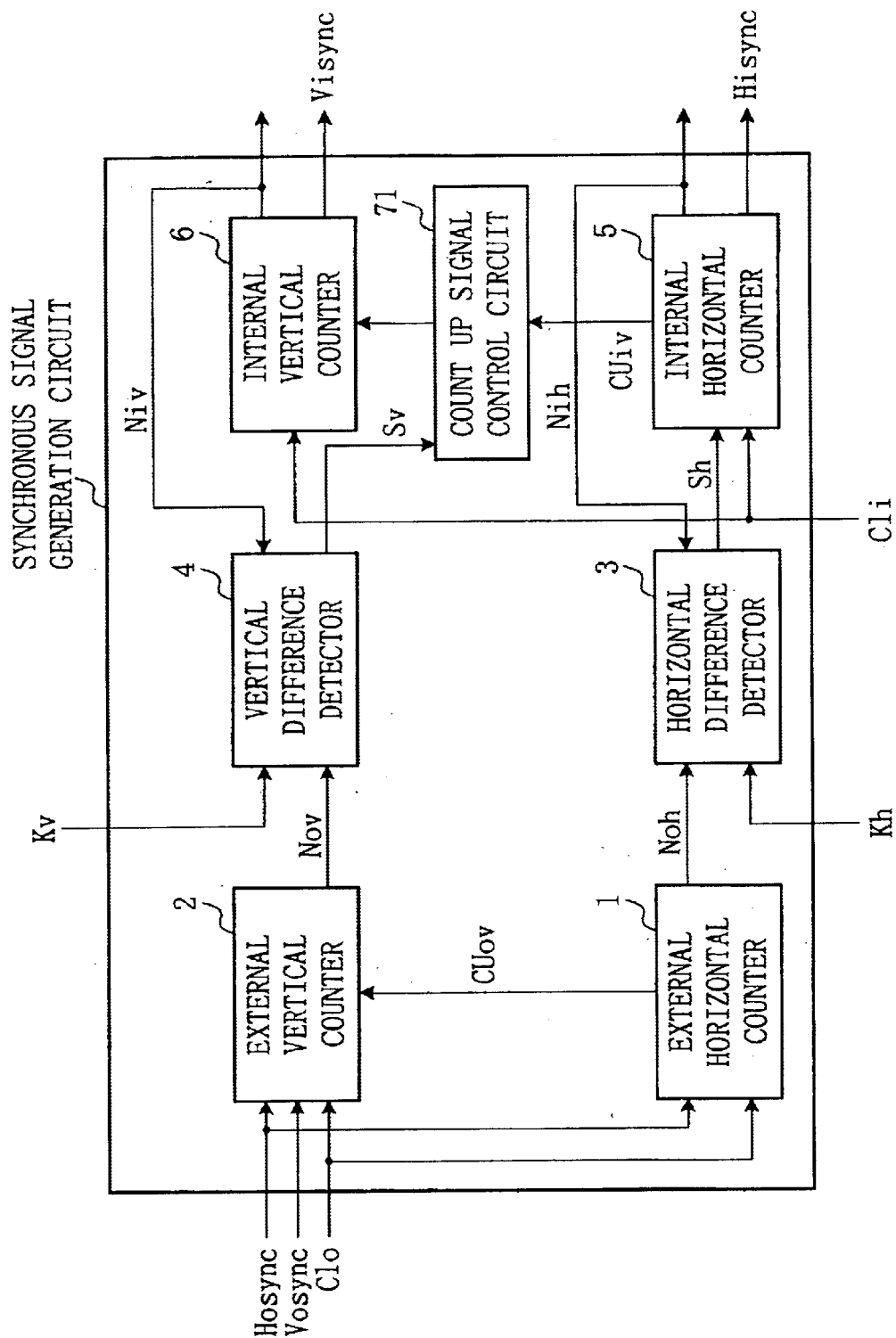
FIG. 6 is a block diagram of a synchronous signal generation circuit according to a second embodiment.

As shown in FIG. 6, the synchronous signal generation circuit according to the second embodiment comprises a count up signal control circuit 71 in addition to the components of the synchronous signal generation circuit of the first embodiment.

The vertical difference detector 4 outputs the vertical counter control signal Sv to the count up signal control circuit 71, not to the internal vertical counter 6.

The internal horizontal counter 5 outputs the internal vertical count up signal CUiv to the internal vertical counter 6 via the count up signal control circuit 71.

The count up signal control circuit 71 controls the supply of the internal vertical count up signal CUiv in accordance with the vertical counter control signal Sv supplied from the vertical difference detector 4. Specifically, the count up signal control circuit 71 stops the supply of a pulse of the internal vertical count up signal CUiv, or generates pulses of the internal vertical count up signal CUiv and supplies the generated pulses successively.

More specifically, in a case where the absolute value of the difference between the internal vertical count value Niv and the external vertical count value Nov (Niv−Nov) is equal to or smaller than the preset value Tv, the vertical difference detector 4 outputs the vertical counter control signal Sv which has been deactivated to the count up signal control circuit 71.

The count up signal control circuit 71 supplies the internal vertical count up signal CUiv supplied from the internal horizontal counter 5 to the internal vertical counter 6 without performing any operation to it, in accordance with the deactivated vertical counter control signal Sv.

In a case where the difference is greater than the preset value Tv, the vertical difference detector 4 outputs the vertical counter control signal Sv which has been activated as well as in the first embodiment to the count up signal control circuit 71.

The count up signal control circuit 711 stops the supply of the internal vertical count up signal CUiv for a predetermined period in accordance with the activated vertical counter control signal Sv. Specifically, the count up signal control circuit 71 stops the supply of some pulses which corresponding to the difference. Because of this, the number of pulses counted by the internal vertical counter 6, that is, the internal vertical count value Niv does not increase for a predetermined period.

In a case where the difference is smaller than the minus value of the preset value Tv, the vertical difference detector 4 outputs the vertical counter control signal Sv which has been activated as well as in the first embodiment to the count up signal control circuit 71.

The count up signal control circuit 71 generates some pulses corresponding to the difference, and supplies the generated pulses successively to the internal vertical counter 6 in accordance with the activated vertical counter control signal Sv. Due to this, the number of pulses counted by the internal vertical counter 6, that is, the internal vertical count value Niv increases by an amount corresponding to the difference.

By doing as described above, the counting operation of the internal vertical counter 6 synchronizes with the counting operation of the external vertical counter 2. In other words, the internal vertical counter 6 repeats counting the internal vertical count up signal CUiv while synchronizing with the external vertical synchronous signal Vosync. Due to this, the internal vertical counter 6 can generate the internal vertical synchronous signal Visync which synchronizes with the external vertical synchronous signal Vosync, and whose phase substantially equals the phase of the external vertical synchronous signal Vosync.

By adding the count up signal control circuit 71, the structure of the internal vertical counter 6 can be simplified compared to the structure of the internal vertical counter 6 of the first embodiment.

Next, a synchronous signal generation circuit according to a third embodiment of the present invention will now be explained below with reference to the drawings.

Figure 7:
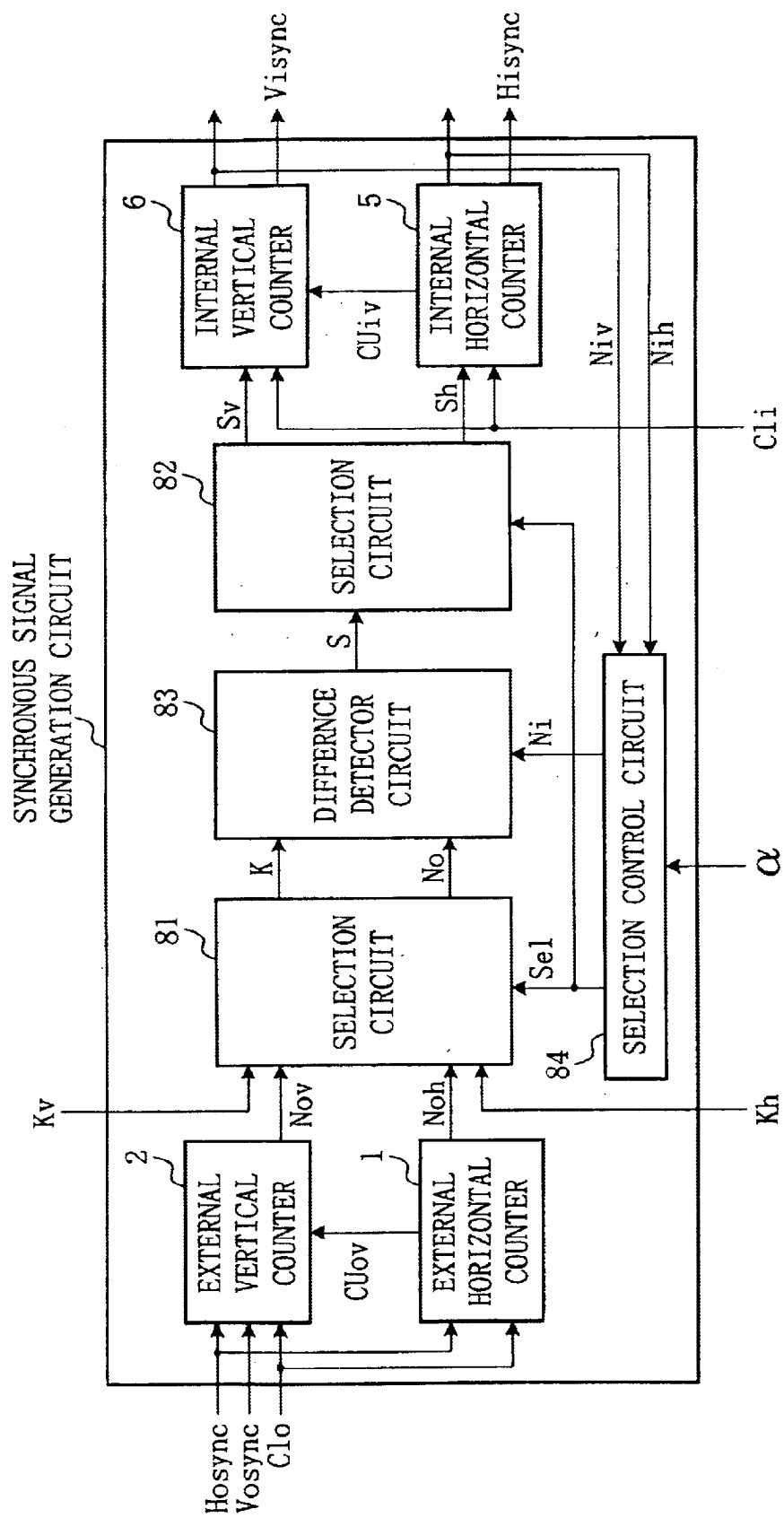
FIG. 7 is a block diagram of a synchronous signal generation circuit according to a third embodiment.

As shown in FIG. 7, the synchronous signal generation circuit according to the third embodiment comprises selection circuits 81 and 82, a difference detector circuit 83, and a selection control circuit 84 instead of the horizontal difference detector 3 and the vertical difference detector 4 of the first embodiment.

The external horizontal counter 1 outputs the external horizontal count value Noh to the selection circuit 81.

The external vertical counter 2 outputs the external vertical count value Nov to the selection circuit 81.

The internal horizontal counter 5 outputs the internal vertical count value Nih to the selection control circuit 84.

The internal vertical counter 6 output the internal vertical count value Niv to the selection control circuit 84.

The horizontal check value Kh and the vertical check value Kv are supplied to the selection circuit 81 from a predetermined circuit of the image processing apparatus.

The selection control circuit 84 is supplied from a predetermined circuit of the image processing apparatus with a check ratio a representing the ratio between the number of times to perform a horizontal control operation for controlling the internal horizontal counter 5, and the number of times to perform a vertical control operation for controlling the internal vertical counter 6. The check ratio a is determined, for example, based on a ratio between the cycle of the external horizontal synchronous signal Hosync, and the cycle of the external vertical synchronous signal Vosync. For example, in a case where the cycle of the external horizontal synchronous signal Hosync is five times as large as the cycle of the external vertical synchronous signal Vosync, the check ratio α is 4. That is, the vertical control operation is performed once in every four times of performing the horizontal control operation.

The selection control circuit 84 outputs a selection signal Sel representing which of the horizontal control operation and the vertical control operation to be performed to the selection circuits 81 and 82 in accordance with the check ratio α.

The selection control circuit 84 outputs the supplied internal horizontal count value Nih or the supplied internal vertical count value Niv to the difference detector circuit 83 as an internal count value Ni in accordance with the check ratio a. Specifically, the selection control circuit 84 outputs the internal horizontal count value Nih in case of performing the horizontal control operation, and the internal vertical count value Niv in case of performing the vertical control operation to the difference detector circuit 83 as the internal count value Ni.

The selection circuit 81 outputs one of the horizontal check value Kh and the vertical check value Kv, and one of the external horizontal count value Noh and the external vertical count value Nov to the difference detector circuit 83 in accordance with the selection signal Sel. Specifically, in a case where supplied with the selection signal Sel representing the horizontal control operation, the selection circuit 81 outputs the horizontal check value Kh as a check value K, and the external horizontal count value Noh as an external count value No to the difference detector circuit 83. And in a case where supplied with the selection signal Sel representing the vertical control operation, the selection circuit 81 outputs the vertical check value Kv as a check value K, and the external vertical count value Nov as an external count value No to the difference detector circuit 83.

The difference detector circuit 83 performs the same control operation as that of the horizontal difference detector 3 and the vertical difference detector 4 shown in the first embodiment. The difference detector circuit 83 generates a counter control signal S with using the check value K and the external count value No, and the internal count value Ni supplied from the selection control circuit 84.

Specifically, in case of performing the horizontal control operation, the horizontal check value Kh as the check value K, and the external horizontal count value Noh as the external count value No are supplied to the difference detector circuit 83 from the selection circuit 81. And the internal horizontal count value Nih as the internal count value Ni is supplied to the difference detector circuit 83 from the selection control circuit 84. The difference detector circuit 83 generates the counter control signal S for controlling the operation of the internal horizontal counter 5 with using the supplied values, and outputs the generated counter control signal S to the selection circuit 82.

In case of performing the vertical control operation, the vertical check value Kv as the check value K, and the external vertical count value Nov as the external count value No are supplied to the difference detector circuit 83 from the selection circuit 81. And the internal vertical count value Niv as the internal count value Ni is supplied to the difference detector circuit 83 from the selection control circuit 84. The difference detector circuit 83 generates the counter control signal S for controlling the operation of the internal vertical counter 6 with using the supplied values, and outputs the generated counter control signal S to the selection circuit 82.

The selection circuit 82 outputs the counter control signal S to the internal horizontal counter 5 or to the internal vertical counter 6 in accordance with the selection signal Sel. Specifically, in a case where supplied with the selection signal Sel representing the horizontal control operation, the selection circuit 82 outputs the counter control signal S as the horizontal counter control signal Sh to the internal horizontal counter 5. And in a case where supplied with the selection signal Sel representing the vertical control operation, the selection circuit 82 outputs the counter control signal S as the vertical counter control signal Sv to the internal vertical counter 6.

With the use of the synchronous signal generation circuit according to the third embodiment explained so far, although the operation on the whole becomes slightly complicated, the entire circuits of the synchronous signal generation circuit can be made smaller compared to the circuits of the synchronous signal generation circuits according to the first and second embodiments.

Figure 8:
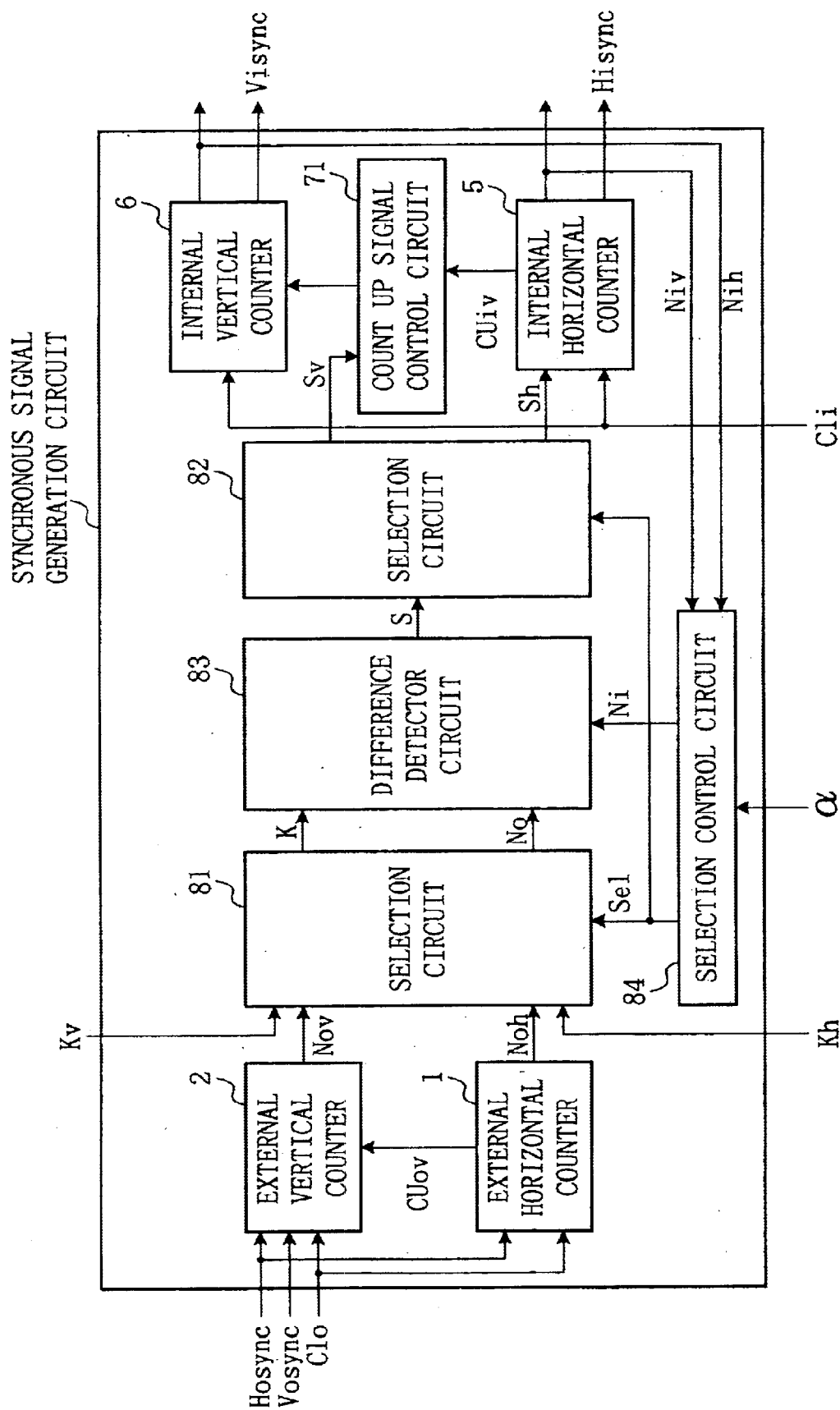
FIG. 8 is a block diagram of a synchronous signal generation circuit according to a fourth embodiment.

A synchronous signal generation circuit according to a fourth embodiment comprises a combination of the structure of the synchronous signal generation circuit shown in the second embodiment and the structure of the synchronous signal generation circuit shown in the third embodiment, as shown in FIG. 8. Specifically, the count up signal control circuit 71 of the second embodiment may be added to the structure of the third embodiment. By doing so, the size of the circuits included in the synchronous signal generation circuit can further be made smaller than the size of the circuits of the third embodiment.

Figure 9:
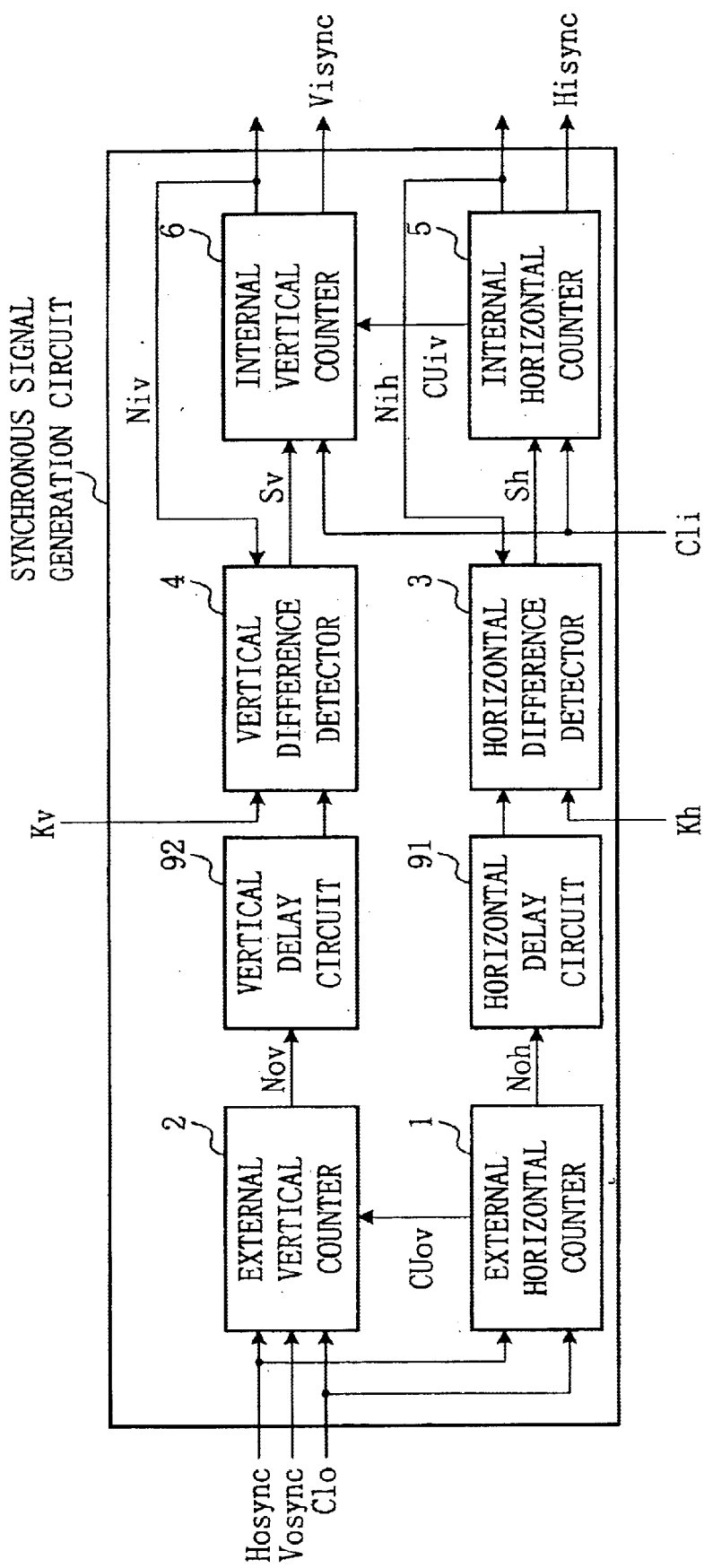
FIG. 9 is a block diagram of a synchronous signal generation circuit according to a fifth embodiment.
Figure 10:
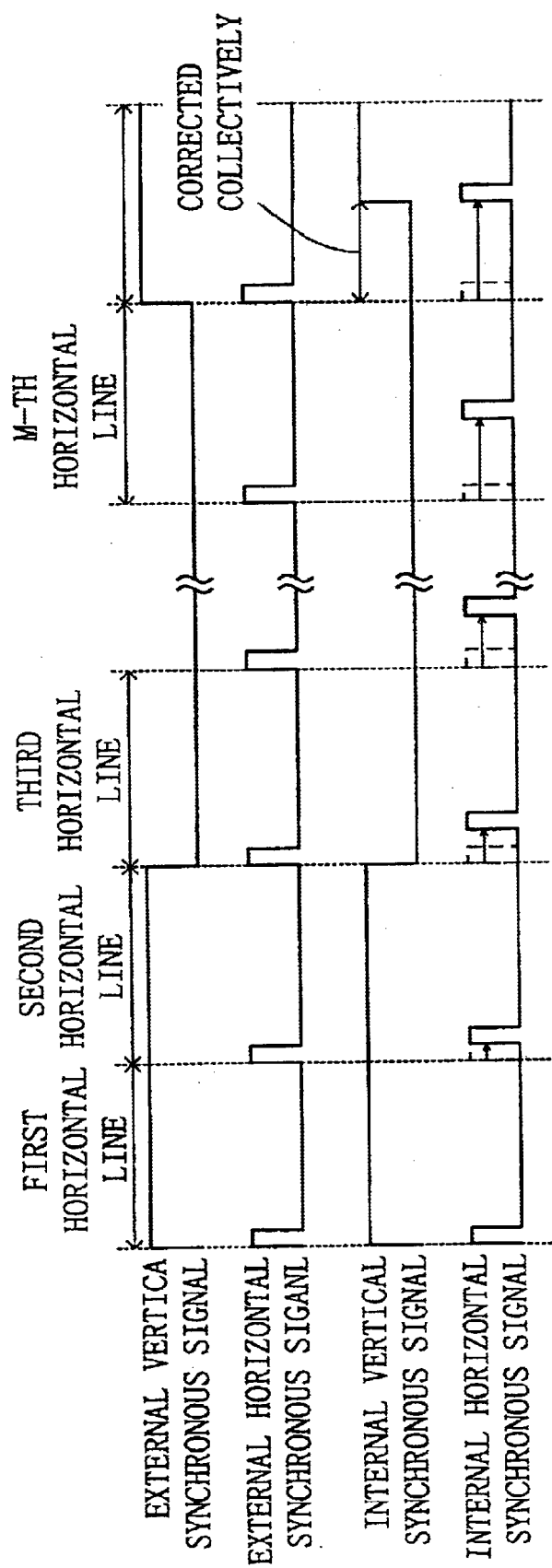
FIG. 10 is a diagram showing the relation between phases of an internal vertical synchronous signal and an internal horizontal synchronous signal generated by a prior art, and phases of an external vertical synchronous signal and an external horizontal synchronous signal generated by a prior art.

A synchronous signal generation circuit according to a fifth embodiment comprises a horizontal delay circuit 91 and a vertical delay circuit 92 in addition to the components of the synchronous signal generation circuit shown in the first embodiment, as shown in FIG. 9.

The synchronous signal generation circuit according to the fifth embodiment is useful in a case where an internal circuit which moves in accordance with the internal horizontal synchronous signal Hisync and the internal vertical synchronous signal Visync spends several clocks in performing a predetermined operation.

The external horizontal counter 1 outputs the external horizontal count value Noh to the horizontal difference detector 3 via the horizontal delay circuit 91.

The external vertical counter 2 outputs the external vertical count value Nov to the vertical difference detector 4 via the vertical delay circuit 92.

The horizontal delay circuit 91 delays the external horizontal count value Noh by a predetermined amount. Specifically, the horizontal delay circuit 91 delays the external horizontal count value Noh in accordance with the number of clocks to be spent while the internal circuit performs a predetermined operation.

The vertical delay circuit 92 delays the external vertical count value Nov by a predetermined amount. Specifically, the vertical delay circuit 92 delays the external vertical count value Nov in accordance with the number of clocks to be spent while the internal circuit performs a predetermined operation.

As described above, by delaying the external horizontal count value Noh and the external vertical count value Nov in accordance with the movement of the internal circuit, the internal horizontal counter 5 and the internal vertical counter 6 can generate synchronous signals which have cycles suitable for the movement of the internal circuit while synchronizing with external synchronous signals. Due to this, the internal circuit can operate in a stable condition.

In the fifth embodiment, the delay amount of the external horizontal count value Noh by the horizontal delay circuit 91, and the delay amount of the external vertical count value Nov by the vertical delay circuit 92 may be variously set. Due to this, pulses of the internal horizontal synchronous signal Hisync and the internal vertical synchronous signal Visync can be generated at various timings. Therefore, image signals of various standards can be dealt with by the synchronous signal generation circuit of the fifth embodiment.

In the fifth embodiment, the synchronous signal generation circuit may comprise any structure, as long as it can delay the external horizontal count value Noh and the external vertical count value Nov by a predetermined amount. For example, instead of the horizontal delay circuit 91 and the vertical delay circuit 92, a single circuit having the functions of both of those circuits may be equipped. Or, the horizontal delay circuit 91 may be built in the horizontal difference detector 3, and the vertical delay circuit 92 may be built in the vertical difference detector 4.

In the first to fifth embodiments, the external horizontal counter 1, the external vertical counter 2, the internal horizontal counter 5, and the internal vertical counter 6 count up the signals. However, the external horizontal counter 1, the external vertical counter 2, the internal horizontal counter 5, and the internal vertical counter 6 may count down the signals.

The apparatus of the present invention can be realized not by a dedicated apparatus, but by an ordinary computer. For example, a program and data for controlling a computer to execute the above-described operations may be stored and distributed in a recording medium (an FD, a CD-ROM, a DVD, and the like). By installing the program and data and executing those program and data under OS, the apparatus of the present invention can be realized. Or, such the program and data may be stored in a disk device or the like included in a server apparatus which exists on the Internet, and a data signal representing such the program and data embedded in a carrier wave may be transferred to a computer and downloaded in the computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-295901 filed on Sep. 28, 2000, and including specification, claims, drawings and summary. The disclosure of the above Japanese Patent Application is incorporated herein by reference in its entirety.

What is claimed is:

1. A synchronous signal generation circuit comprising:
    a first counter which counts pulses of a first clock signal in every first cycle of a supplied first horizontal synchronous signal repeatedly;
    a second counter which repeatedly counts pulses of a second clock signal in every predetermined second cycle, and generates a second horizontal synchronous signal having the second cycle; and
    a first controller which controls the second horizontal synchronous signal to synchronize with the first horizontal synchronous signal by controlling said second counter in accordance with a difference between a first value counted by said first counter, and a second value counted by said second counter.

2. The synchronous signal generation circuit according to claim 1, wherein said first controller controls a phase of the second horizontal synchronous signal to substantially be equal to a phase of the first horizontal synchronous signal by controlling said second counter so that an absolute value of the difference between the first value and the second value is equal to or smaller than a first preset value.

3. The synchronous signal generation circuit according to claim 2, wherein said first controller stops an operation of said second counter for a predetermined period in a case where a value obtained by subtracting the first value from the second value is greater than the first preset value, and controls the operation of said second counter to jump in a case where the value obtained by subtracting the first value from the second value is smaller than a minus value of the first preset value.

4. The synchronous signal generation circuit according to claim 1, wherein:
said first counter generates a first pulse signal having the first cycle, as well as counting pulses of the first clock signal;
said second counter generates a second pulse signal having the second cycle, as well as generating the second horizontal synchronous signal;
said synchronous signal generation circuit further comprises:
a third counter which repeatedly counts pulses of the first pulse signal in every third cycle of a supplied first vertical synchronous signal;
a fourth counter which repeatedly counts pulses of the second pulse signal in every predetermined fourth cycle, and generates a second vertical synchronous signal having the fourth cycle; and
a second controller which controls the second vertical synchronous signal to synchronize with the first vertical synchronous signal by controlling said fourth counter in accordance with a difference between a third value counted by said third counter and a fourth value counted by said fourth counter.

5. The synchronous signal generation circuit according to claim 4, wherein said first controller controls a phase of the second horizontal synchronous signal to substantially be equal to a phase of the first horizontal synchronous signal by controlling said second counter so that an absolute value of the difference between the first value and the second value is equal to or smaller than a first preset value.

6. The synchronous signal generation circuit according to claim 5, wherein said first controller stops an operation of said second counter for a predetermined period in a case where a value obtained by subtracting the first value from the second value is greater than the first preset value, and controls the operation of said second counter to jump in a case where the value obtained by subtracting the first value from the second value is smaller than a minus value of the first preset value.

7. The synchronous signal generation circuit according to claim 5, wherein said second controller controls a phase of the second vertical synchronous signal to substantially be equal to a phase of the first vertical synchronous signal by controlling said fourth counter so that an absolute value of the difference between the third value and the fourth value is equal to or smaller than a second preset value.

8. The synchronous signal generation circuit according to claim 7, wherein said second controller stops an operation of said fourth counter for a predetermined period in a case where a value obtained by subtracting the third value from the fourth value is greater than the second preset value, and controls the operation of said fourth counter to jump in a case where the value obtained by subtracting the third value from the fourth value is smaller than a minus value of the second preset value.

9. The synchronous signal generation circuit according to claim 4, further comprising a signal supplier which supplies the second pulse signal generated by said second counter to said fourth counter, wherein said second controller controls said fourth counter by controlling an operation of said signal supplier.

10. The synchronous signal generation circuit according to claim 9, wherein said second controller controls said signal supplier so that an absolute value of the difference between the third value and the fourth value is equal to or smaller than a second preset value.

11. The synchronous signal generation circuit according to claim 10, wherein by controlling said signal supplier, said second controller stops a supply of the second pulse signal for a predetermined period in a case where a value obtained by subtracting the third value from the fourth value is greater than the second preset value, and successively supplies a predetermined number of pulses of the second pulse signal to said fourth counter in a case where the value obtained by subtracting the third value from the fourth value is smaller than a minus value of the second preset value.

12. The synchronous signal generation circuit according to claim 4, further comprising a delay circuit which delays the first value counted by said first counter, and the third value counted by said third counter, wherein:
said first controller controls said second counter in accordance with a difference between the delayed first value and the second value; and
said second controller controls said fourth counter in accordance with a difference between the delayed third value and the fourth value.

13. A synchronous signal generation circuit comprising:
a first counter which repeatedly counts pulses of a first clock signal in every first cycle of a supplied first horizontal synchronous signal, and generates a first pulse signal having the first cycle;
a second counter which repeatedly counts pulses of a second clock signal in every predetermined second cycle, generates a second horizontal synchronous signal having the second cycle, and generates a second pulse signal having the second cycle;
a third counter which repeatedly counts pulses of the first pulse signal in every third cycle of a supplied first vertical synchronous signal;
a fourth counter which repeatedly counts pulses of the second pulse signal in every predetermined fourth cycle, and generates a second vertical synchronous signal having the fourth cycle;
a control signal supplier which generates a control signal for controlling an operation of said second counter or said fourth counter in accordance with a difference between a first value counted by said first counter and a second value counted by said second counter, or in accordance with a difference between a third value counted by said third counter and a fourth value counted by said fourth counter, and supplies the control signal to said second counter or to said fourth counter;
a first selector which selects one of the first value and the third value, and one of the second value and the fourth value, and supplies the selected values to said control signal supplier; and
a second selector which selects one of said second counter and said fourth counter as a target to be supplied with the control signal,
wherein:
said second counter generates the second horizontal synchronous signal synchronizing with the first horizontal synchronous signal in accordance with the control signal; and
said fourth counter generates the second vertical synchronous signal synchronizing with the first vertical synchronous signal in accordance with the control signal.

14. A synchronous signal generation method, comprising:

counting pulses of a first clock signal repeatedly in every first cycle of a supplied first horizontal synchronous signal;

counting pulses of a second clock signal in every predetermined second cycle repeatedly;

generating a second horizontal synchronous signal having the second cycle; and controlling the second horizontal synchronous signal to synchronize with the first horizontal synchronous signal, by adjusting the second cycle in accordance with a difference between a first value obtained by counting pulses of the first clock signal and a second value obtained by counting pulses of the second clock signal.

15. The synchronous signal generation method according to claim 14, further comprising:

generating a first pulse signal having the first cycle;

generating a second pulse signal having the second cycle;

counting pulses of the first pulse signal repeatedly in every third cycle of a supplied first vertical synchronous signal;

counting pulses of the second pulse signal repeatedly in every predetermined fourth cycle;

generating a second vertical synchronous signal having the fourth cycle; and controlling the second vertical synchronous signal to synchronize with the first vertical synchronous signal, by adjusting the fourth cycle in accordance with a difference between a third value obtained by counting pulses of the first pulse signal and a fourth value obtained by counting pulses of the second pulse signal.

16. The synchronous signal generation method according to claim 15, further comprising:

delaying the first value; and delaying the third value, wherein:

said controlling the second horizontal synchronous signal to synchronize comprises adjusting the second cycle in accordance with a difference between the delayed first value and the second value; and said controlling the second vertical synchronous signal to synchronize comprises adjusting the fourth cycle in accordance with a difference between the delayed third value and the fourth value.

* * * * *